(12) United States Patent
Marino

(10) Patent No.: US 8,811,037 B2
(45) Date of Patent: Aug. 19, 2014

(54) ADAPTIVE DRIVER DELAY COMPENSATION

(75) Inventor: Filippo Marino, Tremestieri Etneo (IT)

(73) Assignee: Texas Instruments Incorporated, Dallas, TX (US)

( * ) Notice: Subject to any disclaimer, the term of this patent is extended or adjusted under 35 U.S.C. 154(b) by 315 days.

(21) Appl. No.: 13/225,507

(22) Filed: Sep. 5, 2011

(65) Prior Publication Data

US 2013/0058135 A1 Mar. 7, 2013

(51) Int. Cl.
*H02M 3/335* (2006.01)

(52) U.S. Cl.
USPC .......................................... 363/16; 363/56.01

(58) Field of Classification Search
USPC .......... 363/16–20, 21.01, 72, 79–80, 89, 124, 363/127; 323/205, 207, 222, 282–289
See application file for complete search history.

(56) References Cited

U.S. PATENT DOCUMENTS

| | | | |
|---|---|---|---|
| 6,233,161 B1 * | 5/2001 | Balakrishnan et al. | 363/16 |
| 6,952,334 B2 * | 10/2005 | Ball et al. | 361/93.9 |
| 7,542,257 B2 * | 6/2009 | McCormick et al. | 361/91.1 |
| 7,812,647 B2 * | 10/2010 | Williams | 327/110 |
| 7,911,808 B2 * | 3/2011 | Huynh et al. | 363/16 |
| 7,952,893 B2 * | 5/2011 | Hiasa | 363/21.01 |

OTHER PUBLICATIONS

"Datasheet for L6561: Power Factor Corrector," Jun. 2004, Rev. 16, pp. 1/13-13/13.

* cited by examiner

*Primary Examiner* — Rajnikant Patel
(74) *Attorney, Agent, or Firm* — William B. Kempler; Frederick J. Telecky, Jr.

(57) ABSTRACT

Peak current in a switching converter is controlled using a closed loop to compensate for error caused by delay time in the switching transistor and control logic. A reference value is established that represents a target current value. A compensated reference value is derived from the reference value by the closed loop. A periodic inductor current is formed in the switching converter in response to the compensated reference value. An error signal is formed that is indicative of an amount of time the inductor current exceeds the target current value. The compensated reference value is dynamically adjusted by the compensation closed loop to minimize the error signal.

10 Claims, 11 Drawing Sheets

ADAPTIVE DRIVER DELAY COMPENSATION

FIELD OF THE INVENTION

This invention generally relates to switching power converters, and in particular to accurately limiting peak current in a switching power converter.

BACKGROUND OF THE INVENTION

A switched-mode power supply (SMPS), also referred to simply as a switcher, is an electronic power supply that incorporates a switching regulator in order to be highly efficient in the conversion of electrical power. Like other types of power supplies, an SMPS transfers power from a source like the electrical power grid to a load while converting voltage and current characteristics. An SMPS is usually employed to efficiently provide a regulated output voltage, typically at a level different from the input voltage. Unlike a linear power supply, the pass transistor of a switching mode supply switches very quickly (typically between 50 kHz and 1 MHz) between full-on and full-off states, which minimizes wasted energy. Voltage regulation is provided by varying the ratio of on to off time. In contrast, a linear power supply must dissipate the excess voltage to regulate the output. This higher efficiency is the chief advantage of a switched-mode power supply.

Switching regulators may be used as replacements for linear regulators when higher efficiency, smaller size or lighter weight is required. However, they are more complicated, their switching currents can cause electrical noise problems if not carefully suppressed, and simple designs may have a poor power factor.

A SMPS may be used to provide power for personal computers, various types of mobile devices such as cellular telephones and personal digital assistants (PDA), games and toys, home entertainment systems, office and industrial applications, etc.

SUMMARY OF THE INVENTION

An embodiment of the present invention provides a method and a system for accurately controlling peak current in a switching regulator. An error signal is formed that is indicative of an amount of time the load current exceeds a peak current reference value. A reference value is dynamically adjusted to minimize the error signal and thereby accurately control peak current.

BRIEF DESCRIPTION OF THE DRAWINGS

Particular embodiments in accordance with the invention will now be described, by way of example only, and with reference to the accompanying drawings.

Figure 1:
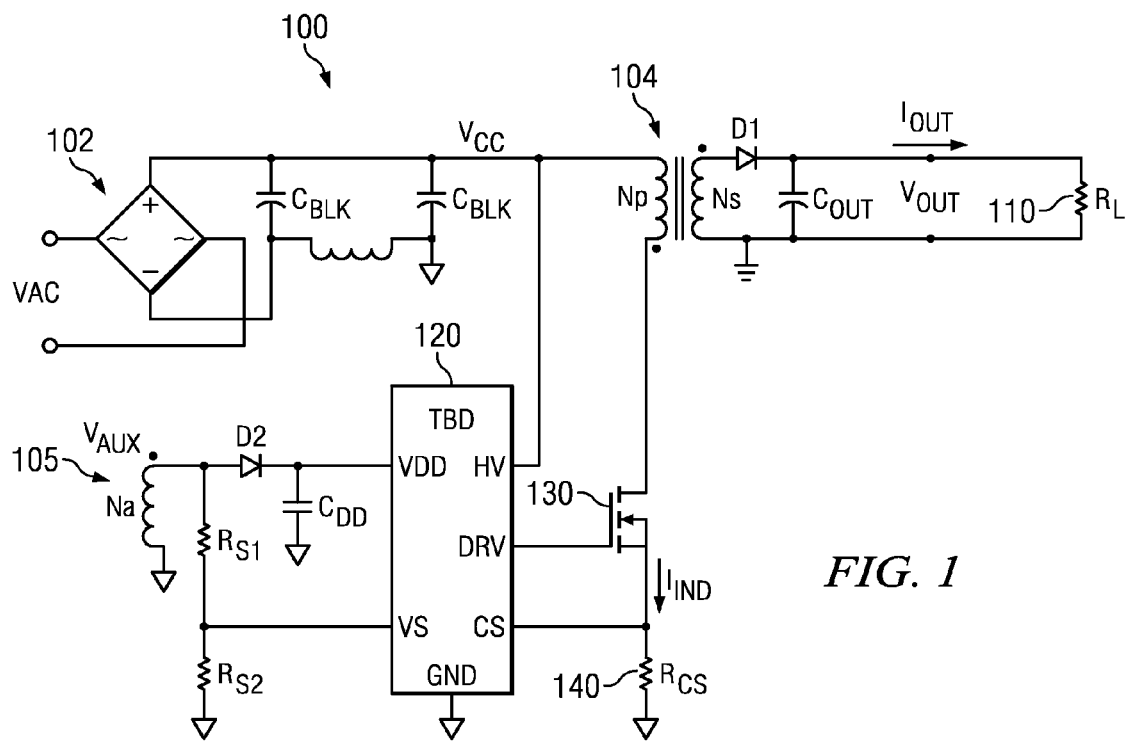
FIG. 1 is an illustrative schematic of a switcher that utilizes an embodiment of the invention.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In some applications, there is a need to monitor a parameter and to accurately control the parameter. For example, it may be desirable to change the output state of a driver from "on" to "off" when the parameter reaches the desired trip point. In the real word, when the desired trip point is reached, there will be a time delay (Td) to change the output state. During the delay (Td) an analog parameter may continue to move. When the output state changes there may be an error on the parameter being controlled. An example, although not exhaustive, is control of peak current for a switching converter.

In many switched-mode power supply (SMPS) applications, the amount of current provided by the SMPS is determined only by the load to which power is being provided. Typically, an over-current protection device or circuit may be incorporated to prevent damage to the SMPS when the load draws too much current. An SMPS may include a peak current control on the switcher to limit the peak load current. However, in a typical SMPS the peak current does not need to be accurately controlled.

In fact, if the inductor current in the switcher is monitored, when it reaches the current threshold the driver may be switched off. However, from the point in time when current threshold recognition occurs to the point in time when effective switch-off occurs, there will be a time delay (Td). During this delay (Td), the current through the inductor may continue to increase and there will therefore be an error on peak current detection. This error is due to (Td) delay. The error is application dependent because it depends upon: inductor value, supply voltage, etc. Therefore, it is difficult to compensate.

Embodiments of the present invention may use a digital error signal generated using an ideal threshold to modify a compensated threshold of the circuit so that Td can be anticipated and compensated for. The compensated threshold is modified by using a feedback loop to minimize the error signal in steady state.

As will be explained in more detail below, embodiments of the invention are easy to implement. It is adaptive and may be independent of application parameters. When embodied within a typical SMPS control module, it does not need external components or a new pin.

FIG. 1 is an illustrative schematic of a switched-mode power supply 100 that utilizes an embodiment of the invention. This is an example of an isolated flyback converter type of SMPS. SMPS 100 includes a rectifier 102 that transforms an alternating input voltage VAC into a rectified bulk direct current (DC) voltage VCC that is filtered by capacitors $C_{BLK}$. In this example, the input voltage may range from approximately 100 to 300 volts. Flyback isolation transformer 104 includes a primary winding with $N_P$ coil turns and a secondary winding with $N_S$ coil turns. Transformer 104 also includes an auxiliary winding 105 with $N_A$ turns. Voltage developed across the secondary winding is filtered by output capacitor $C_{OUT}$ to form output voltage $V_{OUT}$. Output current $I_{OUT}$ is then provided by SMPS 100 to a load, represented by load resistor 110. Voltage developed across auxiliary winding 105 is filtered by capacitor $C_{DD}$ to form a supply voltage $V_{DD}$ that is provided to control module 120. Switch transistor 130 is controlled by control module 120 to periodically turn on and turn off in order to operate SMPS 100, as will be described in more detail below. Voltage across current sense resistor 140 is monitored by control module 120 and is used to determine when a peak current threshold is reached.

Inductor current $I_{IND}$ flows through the inductor formed by transformer 104 when switch 130 is in an on state. Inductor current $I_{IND}$ is proportional to output current IOUT while flyback converter 100 is working in a discontinuous mode. In this embodiment, only primary current sensing is performed in order to minimize component cost. Thus, output current IOUT may be accurately controlled by accurately controlling the peak value of inductor current $I_{IND}$, as will be explained in more detail below.

The general operating theory of a flyback converter is well known and will now be described briefly. Assume that at t=0 output capacitor $C_{OUT}$ is charged to the nominal output voltage $V_{OUT}$ and that current $I_{IND}$ through the primary windings of transformer 104 is zero. At t=0 switch 130 closes and a current will start to flow through the primary winding. This will induce a voltage over the secondary winding. At this point, diode D1 is reverse biased and therefore no secondary current will flow. Therefore the primary side of the transformer appears as an isolated inductor. As a result, the primary current will start to increase linearly according to I=(VCC/L1)*t, where L1 is the inductance of transformer 104. During the time switch 130 is closed the voltage induced over the secondary windings will be VCC*($N_S/N_P$).

The value of current $I_{IND}$ will be at a peak value when switch 130 opens, and may be referred to as $I_{PEAK}$. The energy then stored at the moment of opening is represented by equation 1.

$$\text{Energy} = 0.5 * L1 * (I_{PEAK} * I_{PEAK}). \quad (1)$$

The transformer wants to sustain the magnetic flux. Since the circuit at the primary side is open the only way the inductor can do this is by inducing a voltage at the secondary side high enough to forward bias diode D1. The initial value of the current will be Ipeak/($N_S/N_P$). This will continue until all of energy stored in the transformer is dumped into filter capacitor $C_{OUT}$ or until switch transistor 130 is again turned on.

Figure 2:
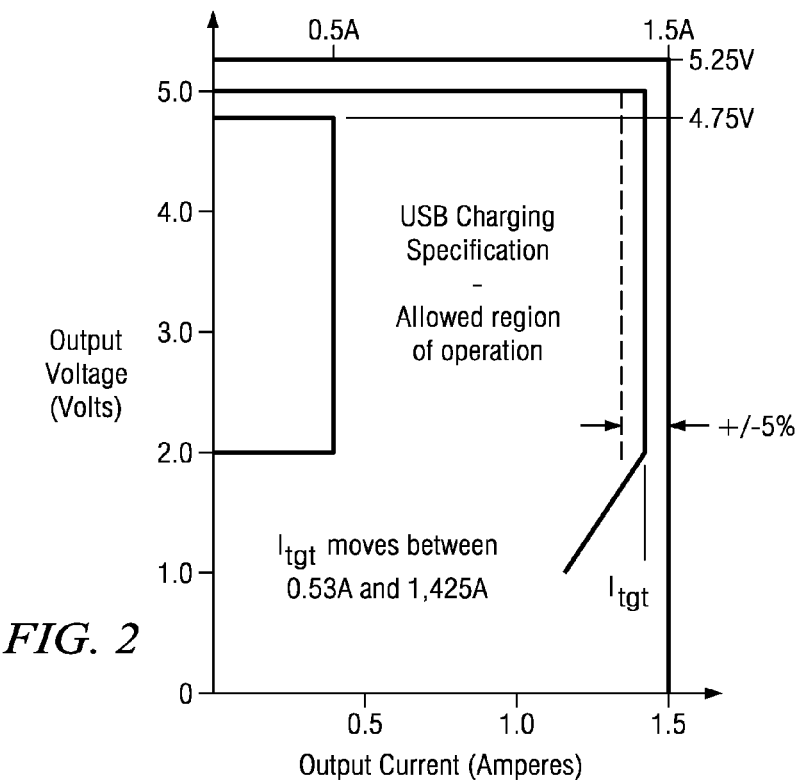
FIG. 2 is plot of V-I characteristics required for an exemplary USB application.

FIG. 2 is plot of V-I characteristics required for an exemplary universal serial bus (USB) application. Various applications may require the control of both voltage and current, such as the USB battery charging specification. For some applications of the USB, there may be a specification that requires an output voltage of 4.75 to 5.25V with an output current precision of +/−5% of target ($I_{TGT}$). In order to achieve output current precision using only primary current sensing, good primary current sensing precision on inductor peak current of the Flyback converter is needed. As mentioned above, on a flyback converter 100 working in discontinuous mode, $I_{OUT}$ current is proportional to inductor peak current sensed on the CS pin of control module 120. This means that precision of current peak sensing directly impacts IOUT precision.

Figure 3:
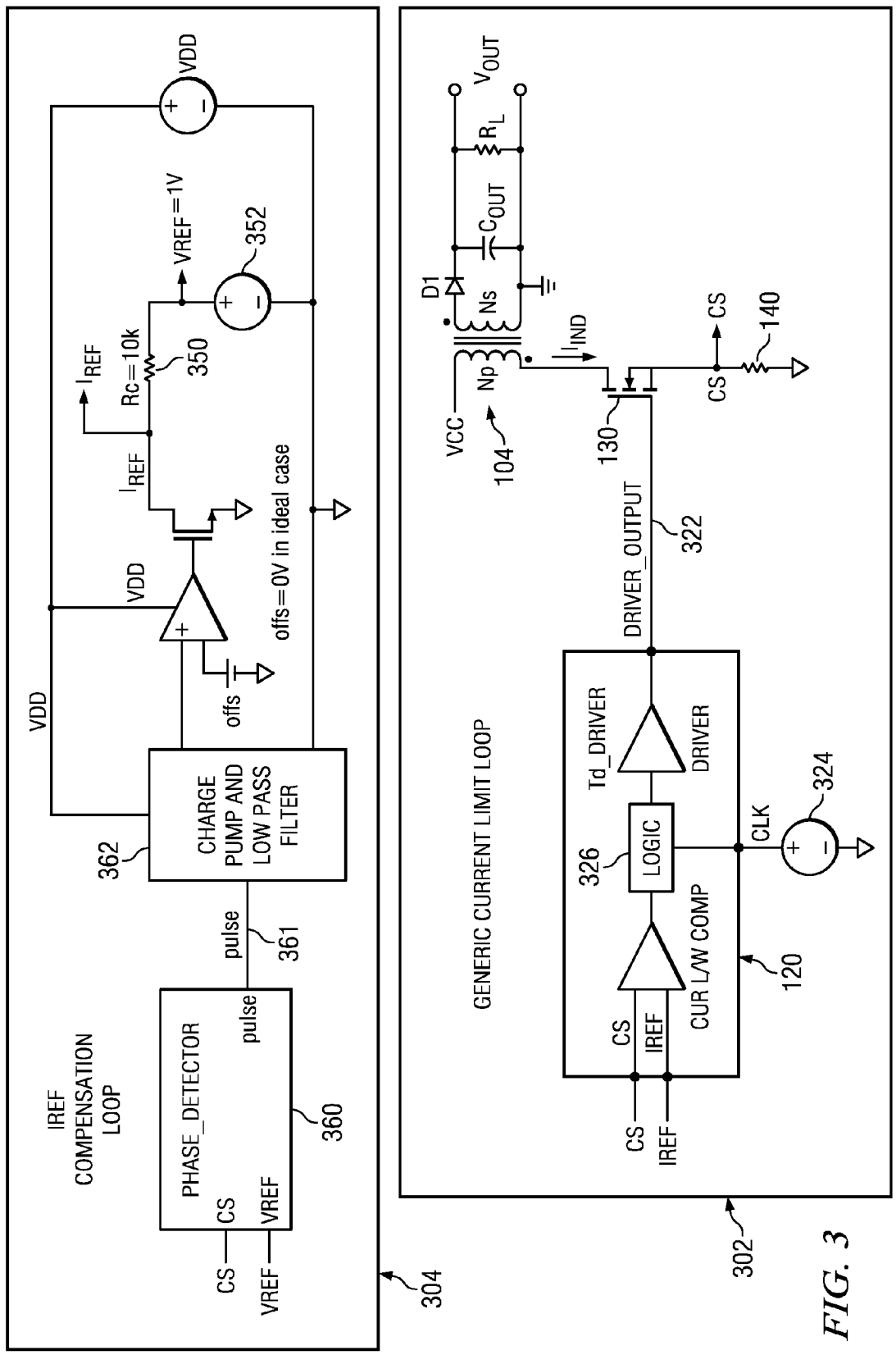
FIG. 3 is a more detailed block diagram of the switcher of FIG. 1.

FIG. 3 is a more detailed block diagram of an embodiment of the switcher of FIG. 1. For a generic peak current loop 302, such as that illustrated in FIG. 3, equations 1-2 define $I_{PEAK}$ as a function of primary inductance ($L_{primary}$) of transformer 104 and propagation time delay of switch transistor 130, where IREF is a reference value for the target peak output current.

$$T_{on} \cong IREF \frac{L_{primary}}{V_{CC}} \quad (1)$$

$$I_{Peak} \approx \frac{V_{CC}}{L_{primary}(T_{on} + T_D)} = IREF + \frac{V_{CC}}{L_{primary}} T_D \quad (2)$$

Logic block 326 is a generic logic block. In this example it is a flip-flop. On the rising edge of CLK signal 324 the power stage is turned on, (driver_output 322=high). If CS exceeds IREF then the peak control loop resets the FF (Driver_output=low) and the power stage is switched off. Otherwise, the driver is turned off on the next edge of the clock. In this example, the clock period is 10 usec.

Figure 4:
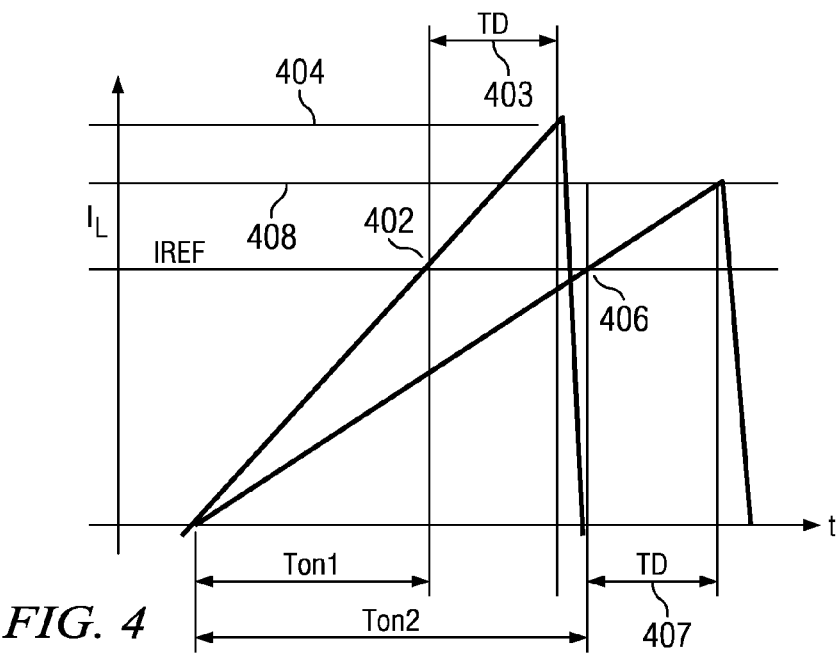
FIG. 4 illustrates delay time variation for different switcher parameters.

FIG. 4 illustrates delay time variation for different values of parameters ($L_{primary}$) and VCC when IREF is not compensated. Error on IPeak value is due to propagation delay TD, which is dependent on VCC and primary inductance. For example, when switch transistor 130 is turned on with one value of VCC, inductor current $I_{IND}$ increases from zero to a value equal to IREF which is sensed by control module 120 at a time indicated at 402. Control module 120 then turns switch transistor 130 off. However, due to propagation delay, additional inductor current continues to flow during time delay period 403 until a final peak current value as indicated by 404 is reached. With a lower value of VCC, the inductor current will rise at a lower rate until the IREF value is sensed as indicated at 406. Control module 120 then turns switch transistor 130 off. However, due to propagation delay, additional inductor current continues to flow during time delay period 407 until a final peak current value as indicated by 408 is reached. As can be seen, the final peak current value varies, based on VCC even when the delay time 403 and 407 are the same. A similar result would happen for different values of primary inductance. The same effect would happen for transition delay (Td) changes due to process variation and/or temperature changes. For this reason compensation cannot be done only with silicon trimming.

It is easy to understand that error on inductor peak current is dependent on transition delay (Td) and current slope. Embodiments of the invention provide a way to keep the peak current completely independent from Td variation and minimize error due to slope variation on inductor current. This is done by anticipating power transistor switch off and adjusting a VREF threshold to a new compensated level, IREF, which is able to compensate for transition delay and variation in inductor current slope.

Referring again to FIG. 3, IREF compensation loop 304 operates in a similar manner to a phase-locked loop to adjust IREF and thereby minimize variation in peak inductor current. In this example, reference signal IREF is modified using a current flowing through resistor 350 that has a value of 10 k ohms. This current is generated using a digital signal 361

(PULSE) produced by phase detector 360 followed by a low-pass filter 362. In this example, VREF is produced by a voltage source 352 that is set at 1.0 volts to represent a desired target current of 1.0 amp. Current diverted through resistor 350 produces an adjusted reference signal IREF that is lower than VREF. This adjusted reference signal IREF is then used by control module 120 in current limit loop 302 to control switch transistor 130.

Pulse signal 361 produced by phase detector 360 represents the time between the intersection of the CS signal from sense resistor 140 with the desired threshold VREF and the actual shutdown of the power output as indicated by the CS signal. IREF compensation loop 304 tries to minimize this pulse length.

Figure 5:
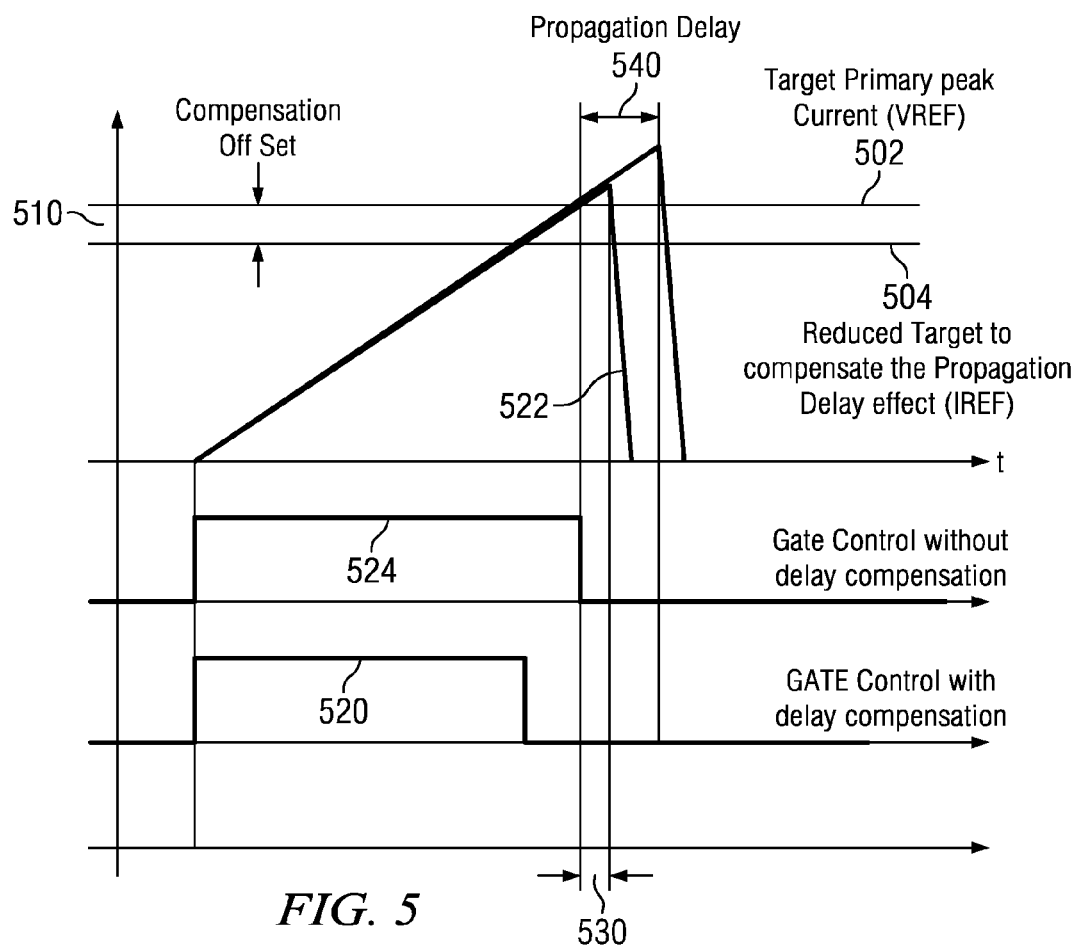
FIG. 5 illustrates adjustment of a reference value to compensate for delay time.

FIG. 5 illustrates adjustment of a reference value to compensate for delay time. VREF signal voltage 502 is one volt in this example to represent a target current of one amp. IREF signal voltage 504 is reduced by the voltage drop across compensation resistor 350 to form a compensation offset 510. Use of compensated reference signal IREF by current loop 302 produces a gate control signal 520 that is used to control switch transistor 130 to produce an inductor current profile 522 that more closely meets the target current defined by reference signal VREF. A residual error 530 may be further reduced be steady state operation of phase locked IREF compensation loop 304. Note that if the uncompensated reference signal VREF 502 is used, current loop 302 would produce a gate control signal 524 that stays active longer since propagation delay 540 is not compensated for.

Simulation of a simple embodiment of compensation loop 304 and current limit loop 302 produces good results, as illustrated by the simulation results presented in Table 1. Note that the compensated circuit has a maximum error of 1.6% while a similar uncompensated circuit has an error of 1-6%-13.2% for various amounts of on time $T_{ON}$ and time delay. On time is a function of supply voltage and primary inductance.

TABLE 1

Simulation results

| Ton time (us) | Standard circuit (Td = 170 ns) Peak current (A) – error (%) | Standard circuit (Td = 340 ns) Peak current (A) – error (%) | Compensated Circuit (independent from Td) Peak current (A) – error (%) |
|---|---|---|---|
| 2.5 | 1.132 – 13.2 | 1.062 – 6.2 | 1.016 – 1.6 |
| 4 | 1.084 – 8.4 | 1.043 – 4.3 | 1.007 – 0.7 |
| 6 | 1.054 – 5.4 | 1.024 – 2.4 | 1.002 – 0.2 |
| 8 | 1.043 – 4.3 | 1.017 – 1.7 | 1.000 – 0.0 |
| 9 | 1.041 – 4.1 | 1.016 – 1.6 | 1.000 – 0.0 |

Figure 6:
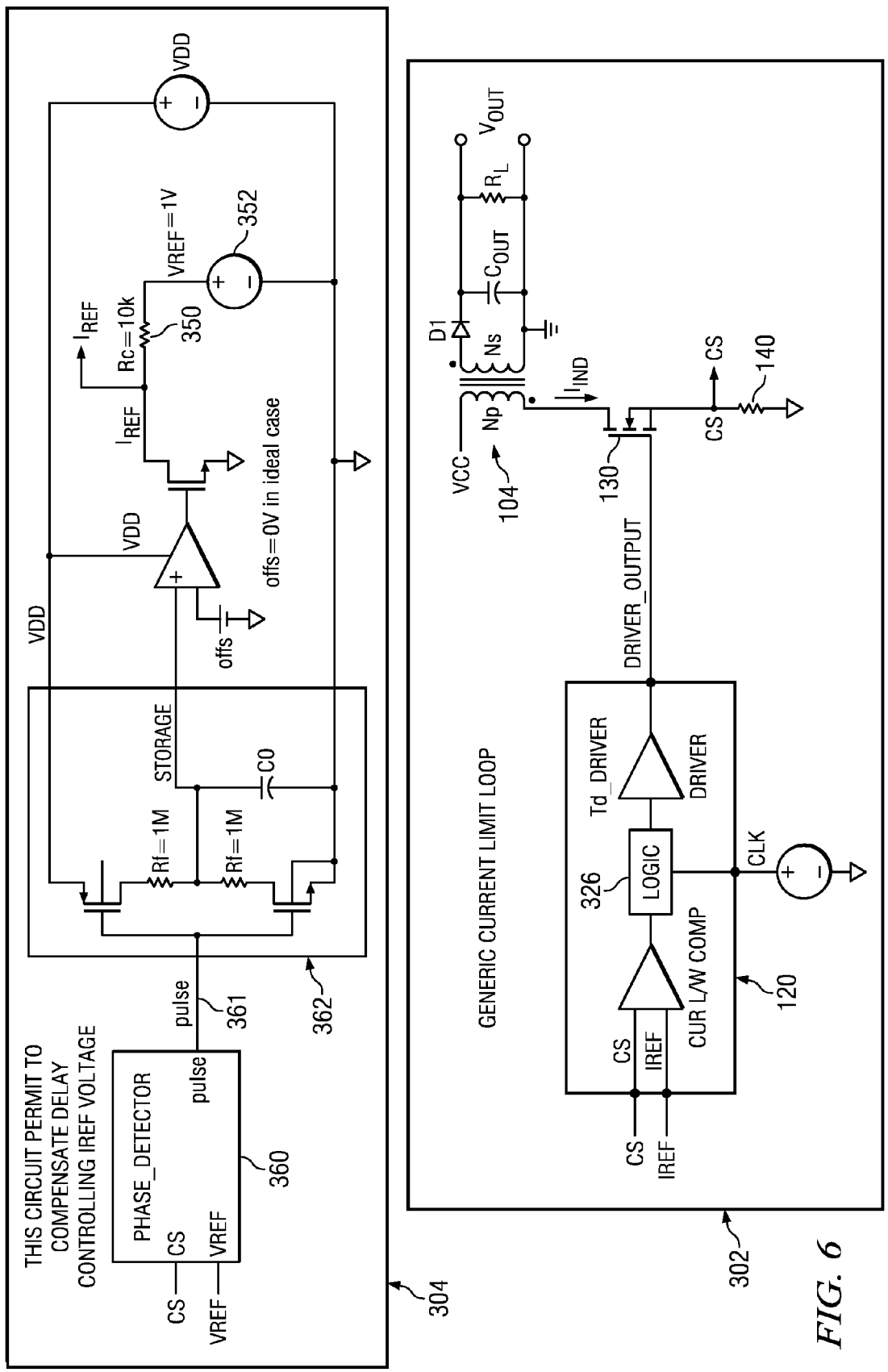
FIG. 6 is a more detailed schematic of the switcher of FIG. 1.

FIG. 6 is a more detailed schematic of the switcher of FIG. 1 and illustrates an embodiment of filter 362 that filters error signal 361 from phase detector 360 for use in adjusting reference signal VREF to form adjusted reference signal IREF.

Figure 7:
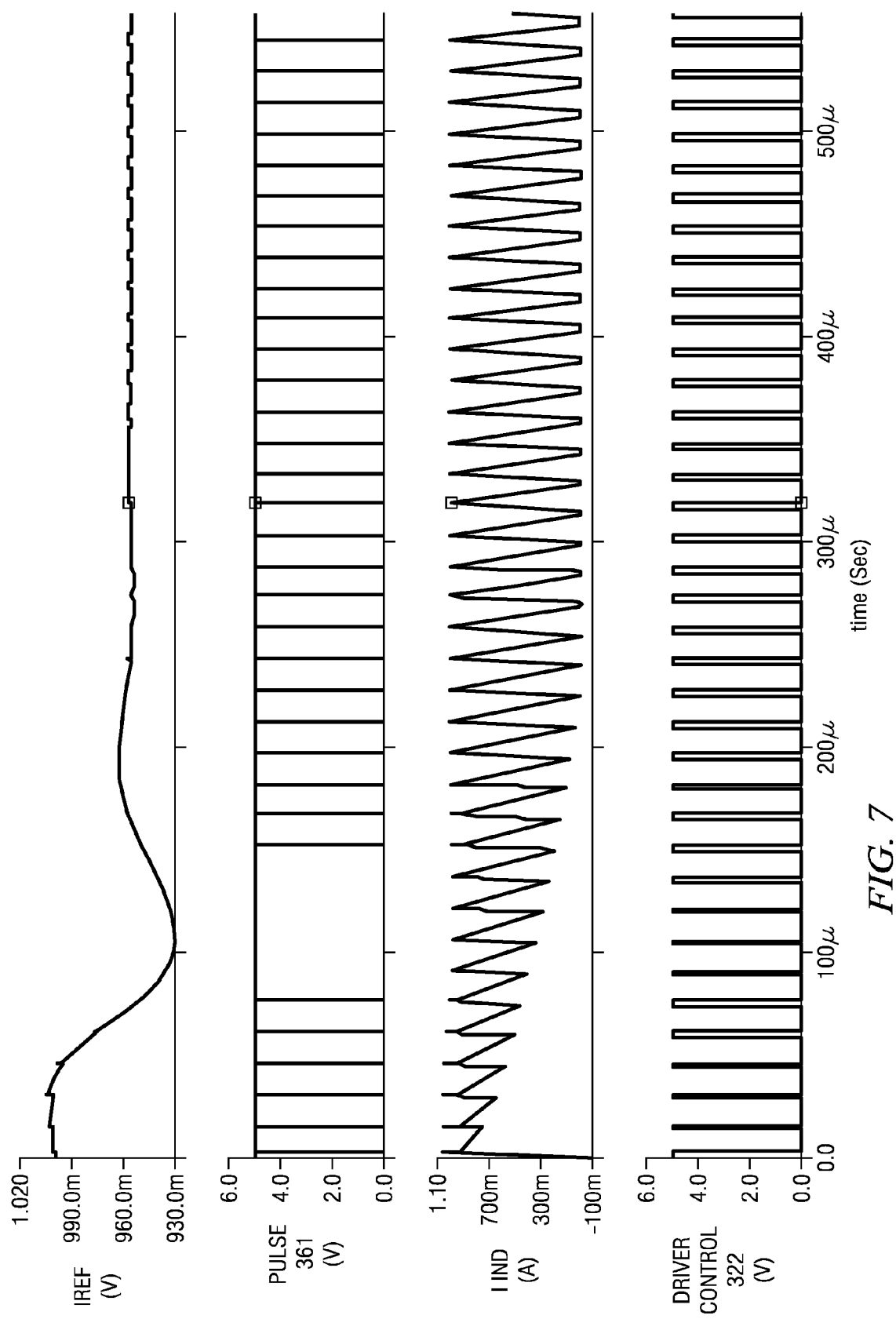
FIGS. 7-10 are waveforms illustrating operation of the switcher of FIG. 1 with different input voltages.
Figure 8:
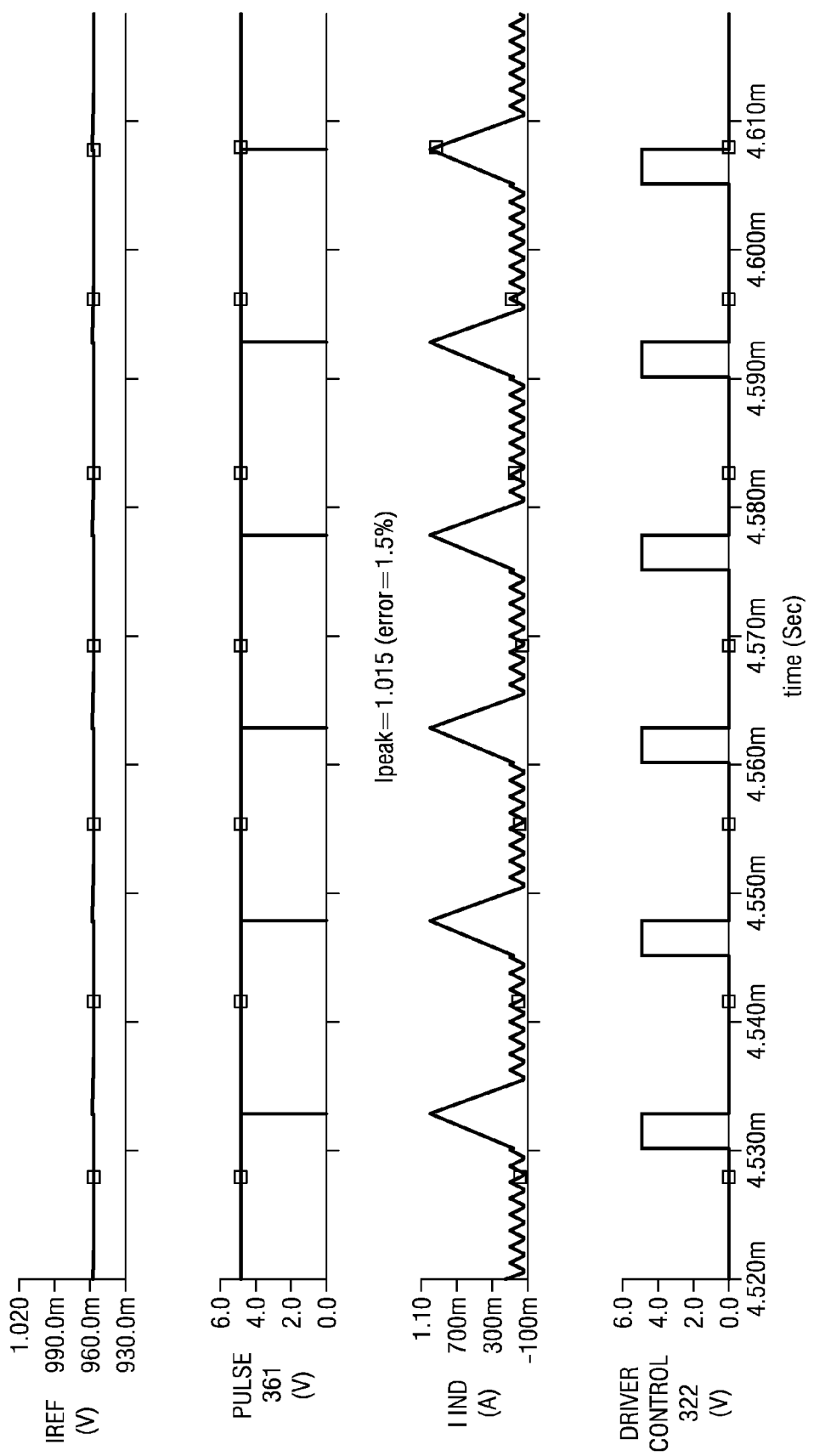
Figure 9:
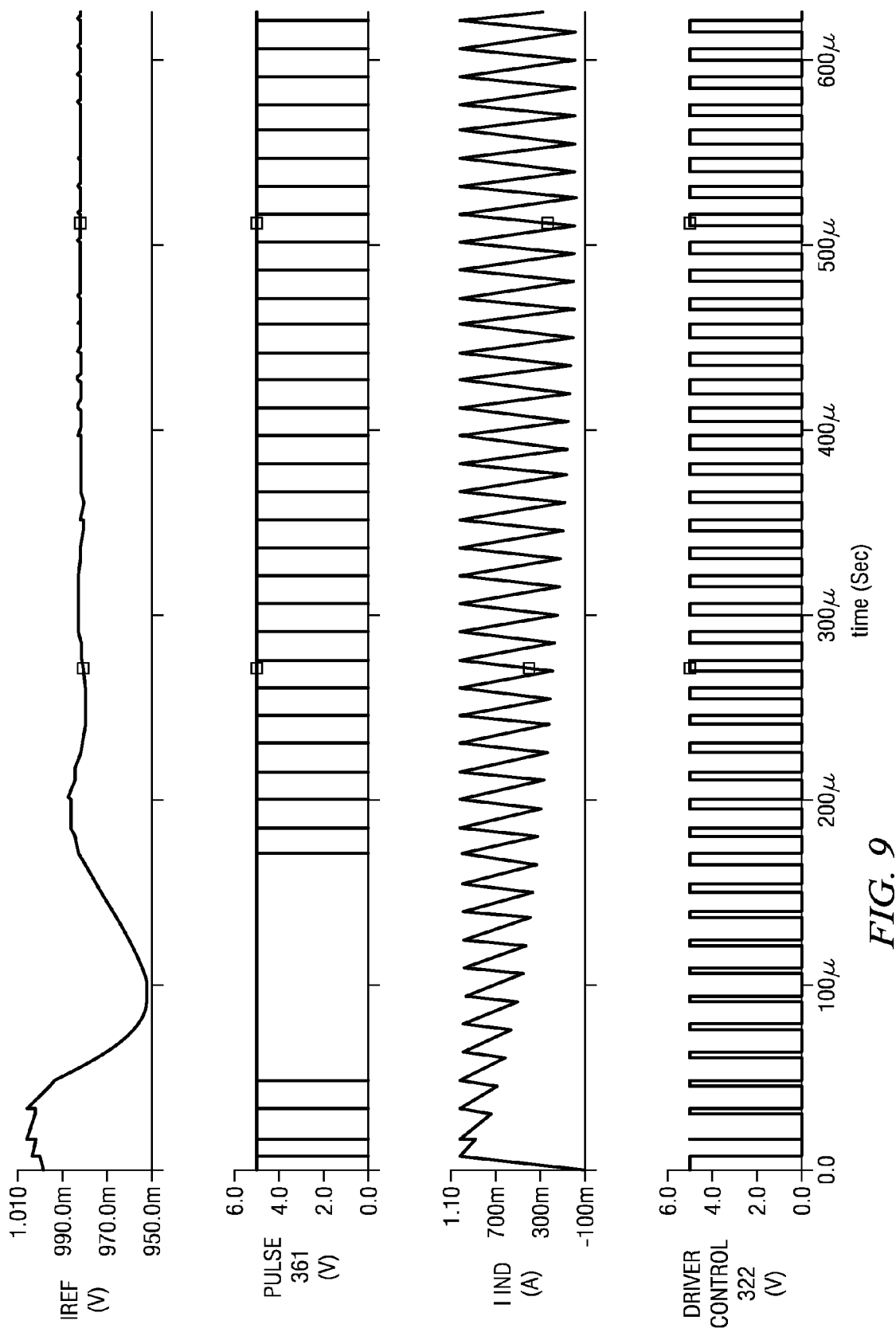
Figure 10:
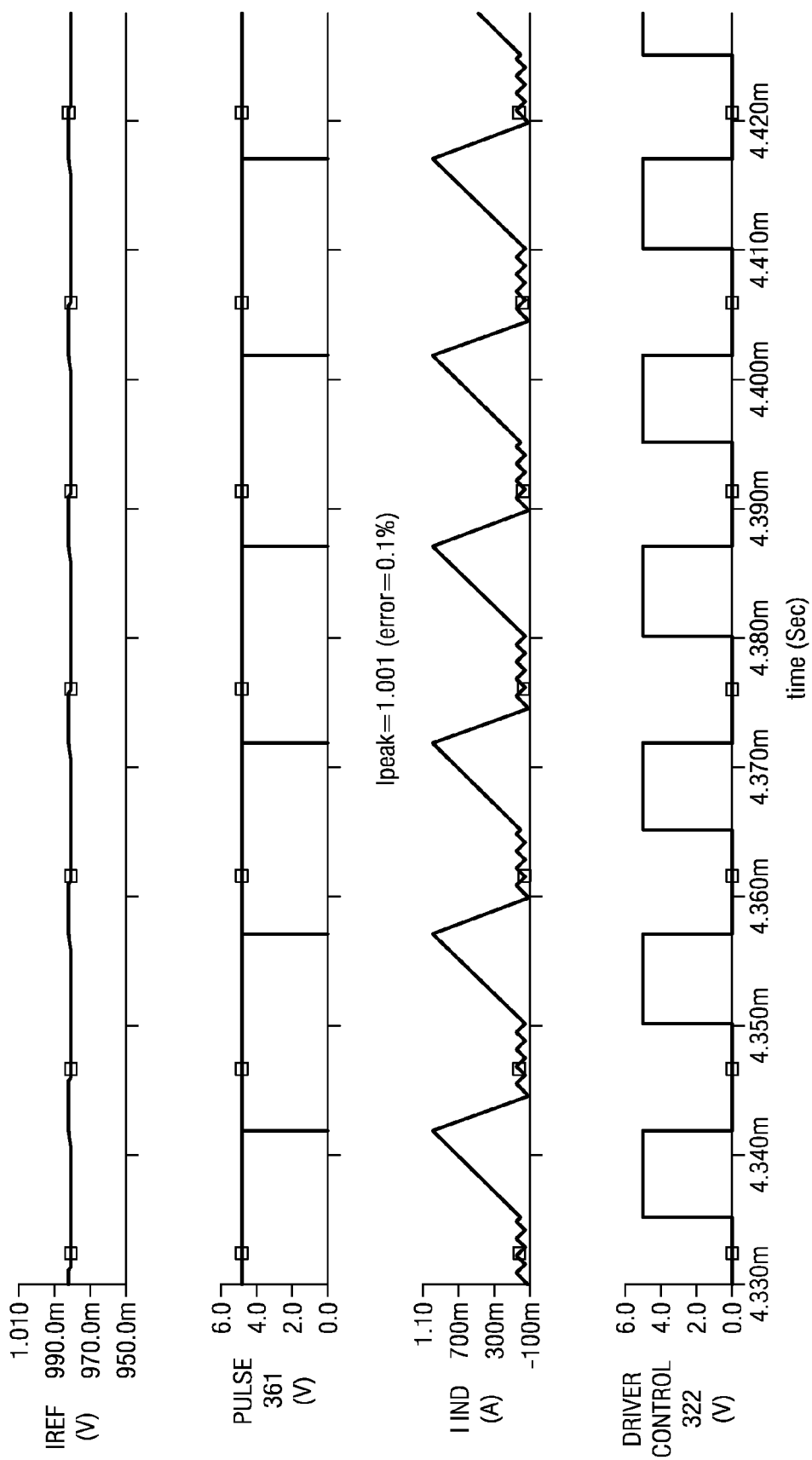

FIGS. 7-10 are waveforms illustrating operation of the switcher of FIG. 1 with different input voltages for a target current of 1.0 amp. FIGS. 7 and 8 illustrate operation of SMPS 100 with a supply voltage of 300 V and a transformer inductance of 800 uH, while FIGS. 9 and 10 illustrate operation with a supply voltage of 130 V. Operation at 300 V produces a Ton by driver control signal of 2.7 usec while operation at 130 V produces a Ton of 6.8 usec.

FIG. 7 illustrates how reference signal IREF is adjusted down from an initial value of 1.0 volts in response to error signal 361 generated by phase detector 360. Current $I_{IND}$ tapers off as output capacitor $C_{OUT}$ becomes fully charged. Driver control signal 322 is adjusted in response to reference signal IREF to control switch transistor 130, as described in more detail above.

FIG. 8 illustrates steady state operation of SMPS 100 and illustrates control of current $I_{IND}$ peak with an error of less than 1.5%.

FIGS. 9 and 10 illustrate similar operation of SMPS 100 with an input voltage of 130V. As shown in FIG. 10, $I_{PEAK}$ is only 0.1%

Figure 11:
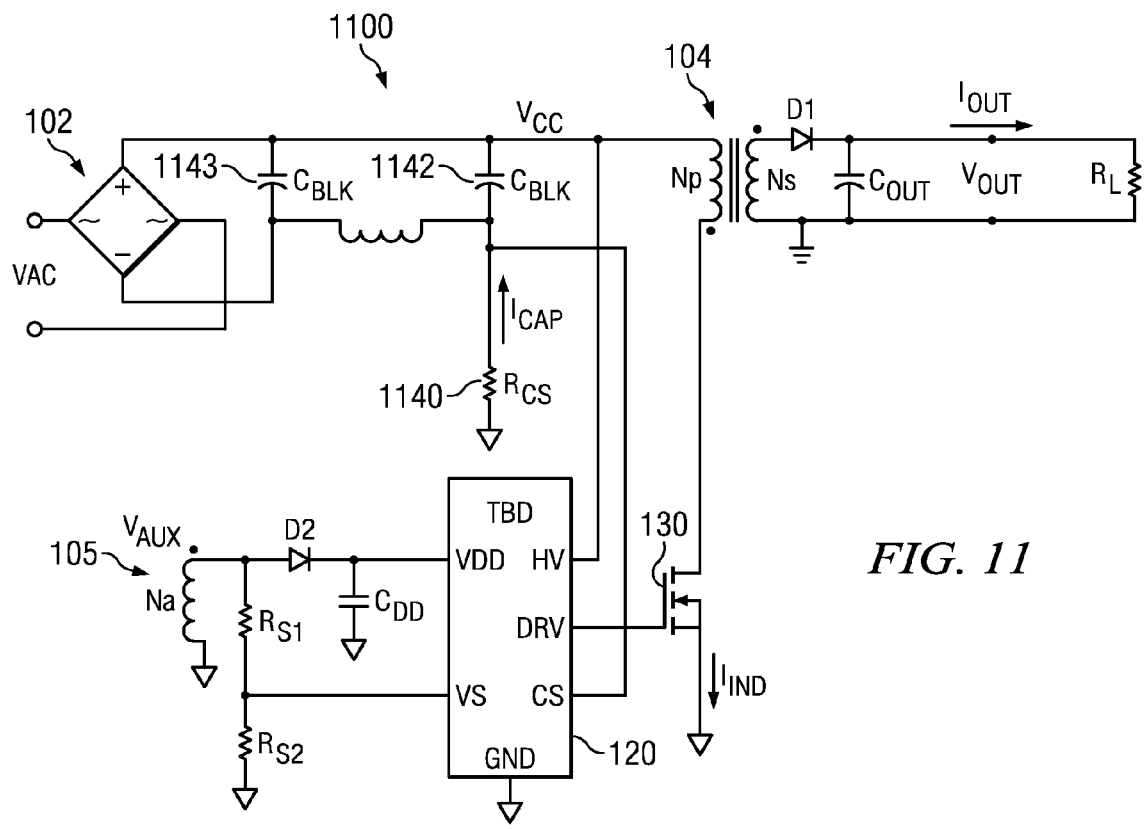
FIG. 11 is a block diagram of another embodiment.

FIG. 11 is a block diagram of another embodiment, switcher 1100. In this embodiment, current sensing resistor 1140 is placed in series with bulk capacitors 1142, 1143 and thereby provides a measure of capacitor current $I_{CAP}$ that flows through capacitors 1142, 1143 to the primary side of transformer 104 to form the inductor current $I_{IND}$. The capacitor current is proportional to the output current $I_{OUT}$ and therefore may be used to determine when peak output current is reached in a similar manner as described above.

Figure 12:
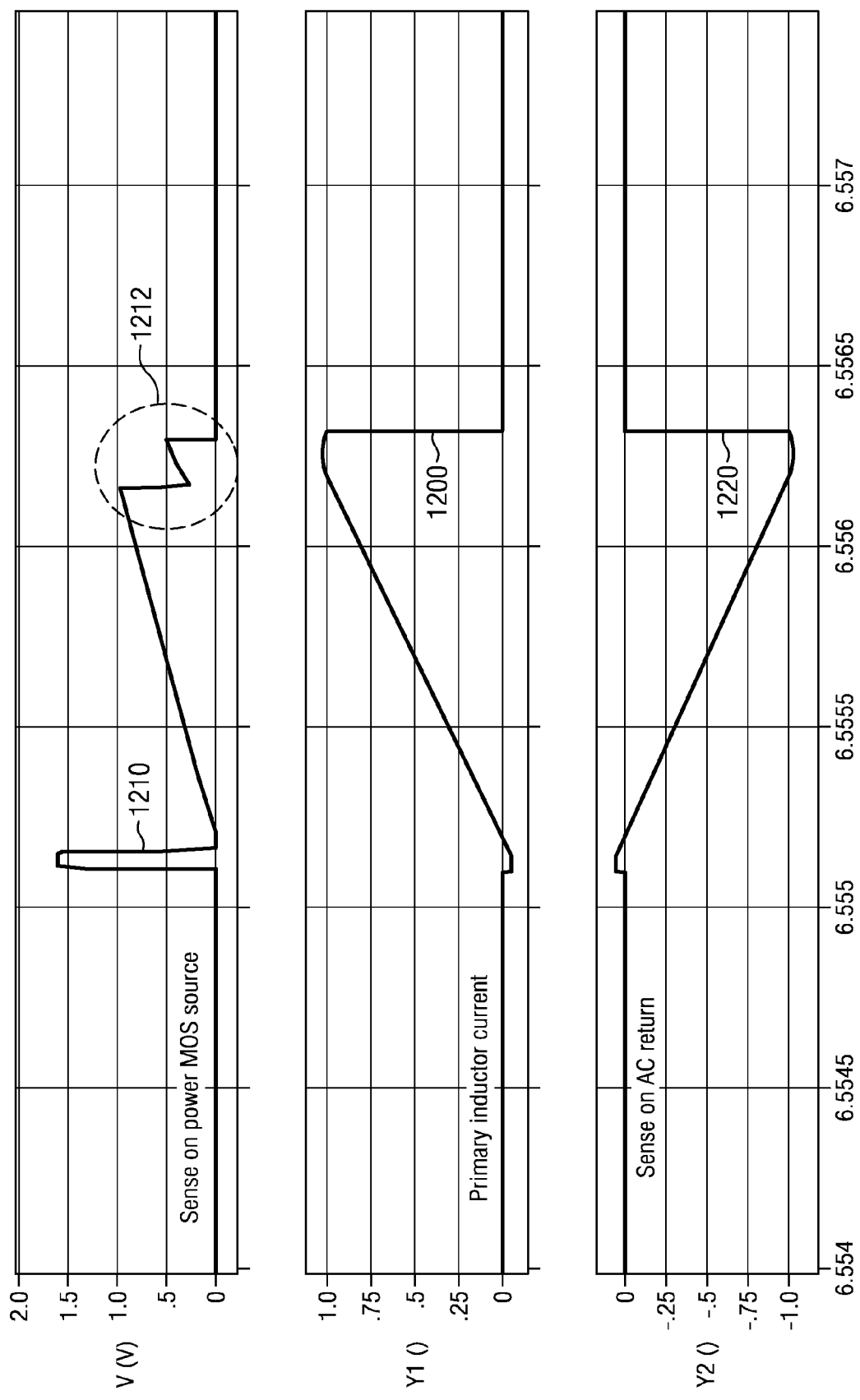
FIG. 12 is a timing diagram illustrating current sensing options.

FIG. 12 is a timing diagram illustrating the current sensing options described above. Signal 1210 illustrates the current sense signal from sense resistor 140 in FIG. 1 that is sensing switch current on the source terminal of MOS transistor 130. Signal 1220 illustrates the current sense signal for sense resistor 1140 in FIG. 11 that is sensing capacitor current $I_{CAP}$ through capacitors 1142, 1143. Signal 1200 illustrates the actual primary inductor current, which is the same in both figures. The capacitor current sensed by sense resistor 1140 is very similar to the actual inductor current, except it is inverted.

Sensing the capacitor current may provide a slightly better result because switch transistor 130 has a certain amount of parasitic capacitance that may cause a slight glitch in the switch current that is sensed by sensor 140 in FIG. 1, as illustrated at 1212. Peak current in the actual inductor current 1200 may be slightly different from peak current sensed at the source of power MOS 130 because of the presence of parasitic capacitance. In this example, the error is about 5% because of a very high parasitic capacitance value in MOS transistor 130.

Figure 13:
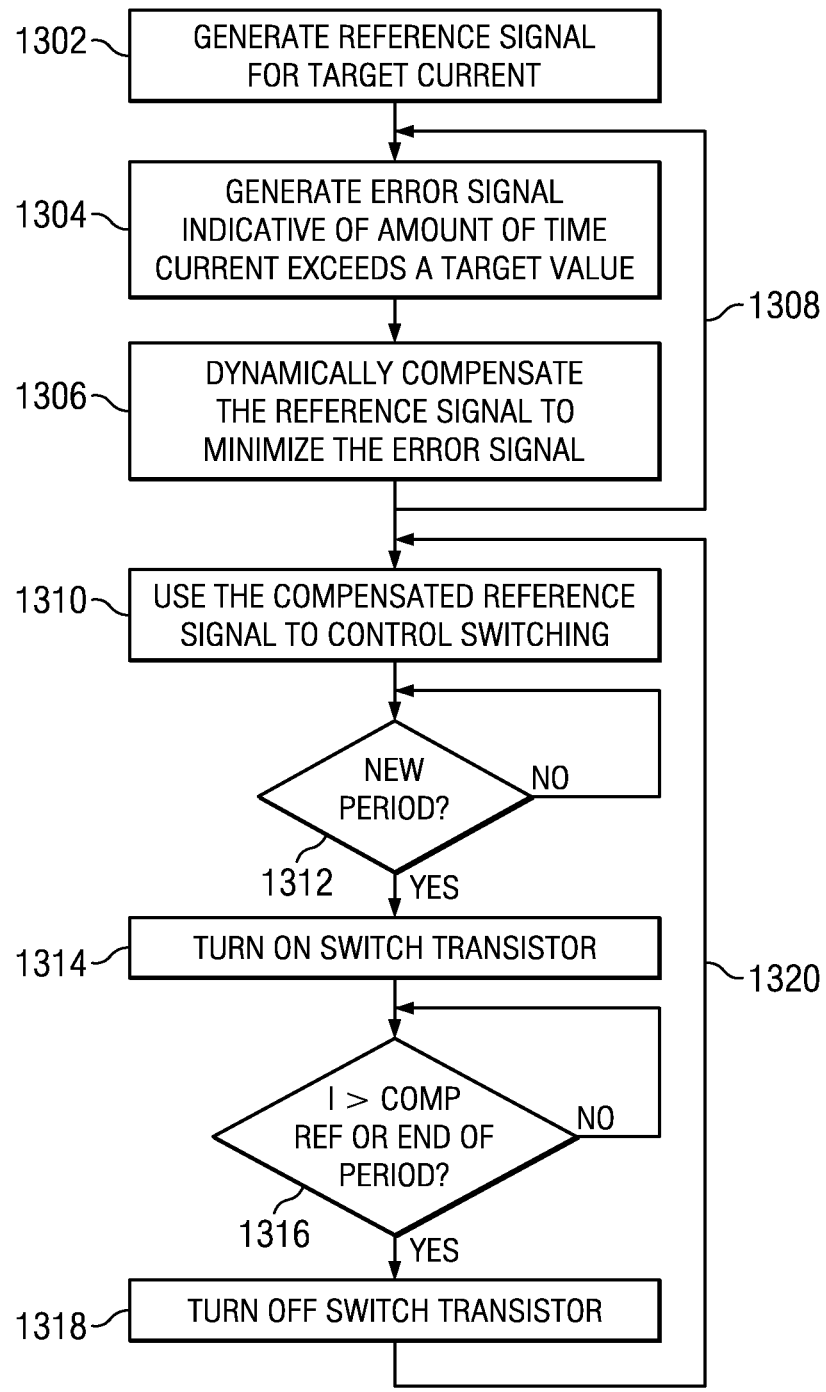
FIG. 13 is a flow diagram illustrating operation of the switcher of FIG. 1.

FIG. 13 is a flow diagram illustrating operation of the SMPS of FIG. 1. As described in more detail above, a reference signal (VREF) is generated 1302 that represents the desired target peak current value. A compensated reference signal (IREF) is adjusted 1306 in response to an error signal (PULSE 361). The error signal is generated 1304 to indicate the amount of time the inductor current $I_{IND}$ exceeds the target peak value. The compensated reference signal is adjusted in a dynamic manner 1308 to continuously reduce the error signal, in a similar manner to a phase locked loop.

The compensated reference signal is used 1310 to control switching of the switch transistor 130. At the beginning 1312 of each clock period, the switch transistor is turned on 1314. When the inductor current $I_{IND}$ exceeds 1316 the compensated reference signal or the period ends the switch transistor is turned off 1318. This current control loop sequence repeats 1320 each period of the clock.

System Example

Figure 14:
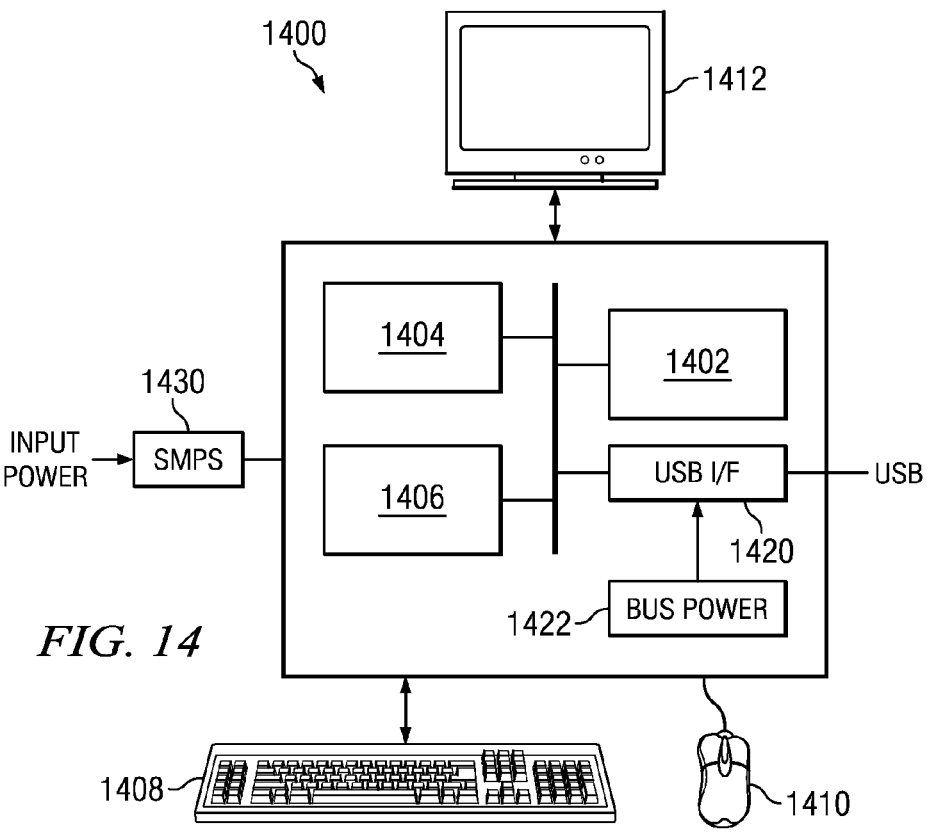
FIG. 14 is a block diagram of a system that includes the switcher of FIG. 1.

FIG. 14 is a block diagram of a system that includes the switcher of FIG. 1. It shows a digital system 1400 (e.g., a personal computer) that includes a processor 1402, associated memory 1404, a storage device 1406, and numerous other elements and functionalities typical of digital systems (not shown). In one or more embodiments of the invention, a digital system may include multiple processors and/or one or more of the processors may be digital signal processors. The digital system 1400 may also include input means, such as a keyboard 1408 and a mouse 1410 (or other cursor control device), and output means, such as a monitor 1412 (or other display device). Those skilled in the art will appreciate that the input and output means may take other forms.

The digital system 1400 may be connected to a network (not shown) (e.g., a local area network (LAN), a wide area network (WAN) such as the Internet, a cellular network, any other similar type of network and/or any combination thereof) via a network interface connection (not shown).

The digital system 1400 may include a universal serial bus interface 1420 and an associated SMPS 1422 to provide bus current for USB I/F 1420. SMPS 1422 embodies aspects of the invention described in more detail above to provide accurate control of output current provided to USB I/F 1420. SMPS 1430 may provide power to other modules within computer system 1400, such as processor 1402, associated memory 1404, storage device 1406, and numerous other elements and functionalities typical of digital systems (not shown). SMPS 1422 and SMPS 1430 may be separate modules, or may be combined into a single unit.

Other Embodiments

While the invention has been described with reference to illustrative embodiments, this description is not intended to be construed in a limiting sense. Various other embodiments of the invention will be apparent to persons skilled in the art upon reference to this description. For example, a simple isolated flyback type SMPS was described herein. Other well known topologies of isolated SMPS as well as non-isolated types such as buck, boost and buck-boost may embody aspects of the invention in order to improve current sensing accuracy.

As described herein, the inductor current is sensed on the primary side of the isolated SMPS transformer. In other embodiments, the inductor current may be sensed on the secondary side of the transformer. In a non-isolated SMPS, the inductor current through an inductor coil is sensed.

While the embodiments described herein convert alternating current (AC) voltage to direct current (DC) voltage, other embodiments may convert DC to DC. By changing the turns ration on the transformer, the output voltage may be correspondingly stepped up or stepped down. In such embodiments, the reference value VREF and compensated reference value IREF are scaled by the turns ratio.

Various applications other than SMPS may also embody aspects of the invention in order to improve accuracy of a monitored parameter that is influenced by other parameters that cannot be statically compensated for. In many applications there is a need to monitor a parameter to change an output state from "on" to "off" when the parameter reaches a desired trip point. In the real word, when the desired trip point is reached, a propagation delay (Td) will delay change of the output state. During the delay (Td), an analog parameter may continue to move. Therefore, when the output state changes an error will occur on the parameter being monitored. Embodiments of the invention may be used to provide a phase locked loop control compensation structure to adjust the trip point to compensate for the delay time.

Certain terms are used throughout the description and the claims to refer to particular system components. As one skilled in the art will appreciate, components in digital and analog systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for controlling peak current in a switching converter, the method comprising:
    establishing a reference value for a target current value;
    deriving a adjusted reference value from the reference value to correct for time delay in turning off a switch of the switching converter;
    forming a periodic inductor current in the switching converter in response to the adjusted reference value;
    forming an error signal indicative of an amount of time the inductor current exceeds the target current value; and
    dynamically adjusting the adjusted reference value to minimize the error signal to generate a regulated peak inductor current.

2. The method of claim 1, wherein the error signal is formed by comparing the reference value to a representation of the inductor current.

3. The method of claim 1, wherein the periodic inductor current is formed by periodically:
    turning on a switch to complete a circuit through an inductor;
    generating a signal indicative of the inductor current; and
    turning off the switch in response to detecting when the inductor current exceeds the adjusted reference value.

4. A system, comprising:
    a switching converter comprising
        a control loop configured to form a periodic signal in response to a adjusted reference value; and
        a adjustment loop coupled to the control loop, the adjustment loop configured to:
        establish a reference value for a target signal value;
        derive a adjusted reference value from the reference value to correct for time delay in turning off a switch of the switching converter;
        form an error signal indicative of an amount of time the signal exceeds the target signal value; and
        dynamically adjust the adjusted reference value to minimize the error signal.

5. The system of claim 4, wherein the control loop comprises an inductor coupled to a switching device, wherein the periodic signal is current flowing through the inductor; and a control module controllably coupled to the switching device, wherein the control module is responsive to the adjusted reference value.

6. The system of claim 5, wherein the adjustment loop comprises:
    a detector to form the error signal, the detector configured to compare the reference value to a representation of the inductor current; and adjustment circuitry coupled to the detector, the adjustment circuitry configured to dynamically adjust the adjusted reference value in response to the error signal.

7. The system of claim 6, wherein the control module is configured to periodically:

turn on the switching device to complete a circuit through the inductor; and turn off the switching device in response to the control module detecting when the inductor current exceeds the adjusted reference value.

8. The system of claim 7, wherein a current sense resistor is coupled to the switch device, such that a voltage across the current sense resistor provides the representation of the inductor current.

9. The system of claim 7, wherein a current sense resistor is coupled to a bulk capacitor that is coupled to the inductor, such that a voltage across the current sense resistor provides the representation of the inductor current.

10. The system of claim 7 being a computer system, further comprising at least one module that is coupled to receive operating power from the switching mode power supply.

* * * * *